United States Patent [19]

Stock

[11] Patent Number: 4,824,425
[45] Date of Patent: Apr. 25, 1989

[54] WEB HEM METHOD AND APPARATUS FOR INSURING A FLAT HEM IN A WEB

[75] Inventor: David K. Stock, Green Bay, Wis.

[73] Assignee: Amplas, Inc., Green Bay, Wis.

[21] Appl. No.: 158,419

[22] Filed: Feb. 22, 1988

[51] Int. Cl.$^4$ .............................................. B31B 1/64
[52] U.S. Cl. .................................. 493/193; 493/225; 493/928; 156/273.1
[58] Field of Search ............... 493/193, 196, 201, 225, 493/928; 29/900; 226/94; 156/273.1, 274.6, 379.6

[56] References Cited

U.S. PATENT DOCUMENTS

| | | | |
|---|---|---|---|
| 4,182,222 | 1/1980 | Stahl | 493/201 |
| 4,372,798 | 2/1983 | Dalton | 156/273.1 |
| 4,419,855 | 12/1983 | Shanklin | 156/273.1 |
| 4,624,654 | 11/1986 | Boyd et al. | 493/225 |
| 4,664,649 | 5/1987 | Johnson et al. | 493/225 |

FOREIGN PATENT DOCUMENTS 573518  11/1945  United Kingdom ............. 156/274.6

Primary Examiner—Frederick R. Schmidt
Assistant Examiner—Robert Showalter
Attorney, Agent, or Firm—Andrus, Sceales, Starke & Sawall

[57] ABSTRACT

A draw tape bag forming apparatus includes an edge folder for folding the edges of pliable plastic web to form a hem in the edge. A draw tape is fed into the open hem which is then heat sealed along the inner edge of the hem wall to form a tubular hem. The web is of an indefinite length and moves continuously through the machine. The heat sealed hem is an expanded air-filled type hem. An electrostatic generator unit is mounted downstream of the ballooned hem. The generator unit includes a charging bar mounted in spaced relation to reference ground plate to form a gap with the ballooned hem passing therebetween. The hem is aligned with the bar. A 120 volt power supply is connected to the charging bar and establishes a high voltage along the length of the bar. An electrostatic field is created across the gap and induces a charge in the walls of the hem the hem collapses against the ground plate to form a flat hem in the web for subsequent passing of the web through a bag making machine which seals and severs the web on longitudinally spaced lines to form the bags. The power supply may establish a negative voltage relative to the ground plate. The power supply may be directly connected to the bar and plate.

13 Claims, 1 Drawing Sheet

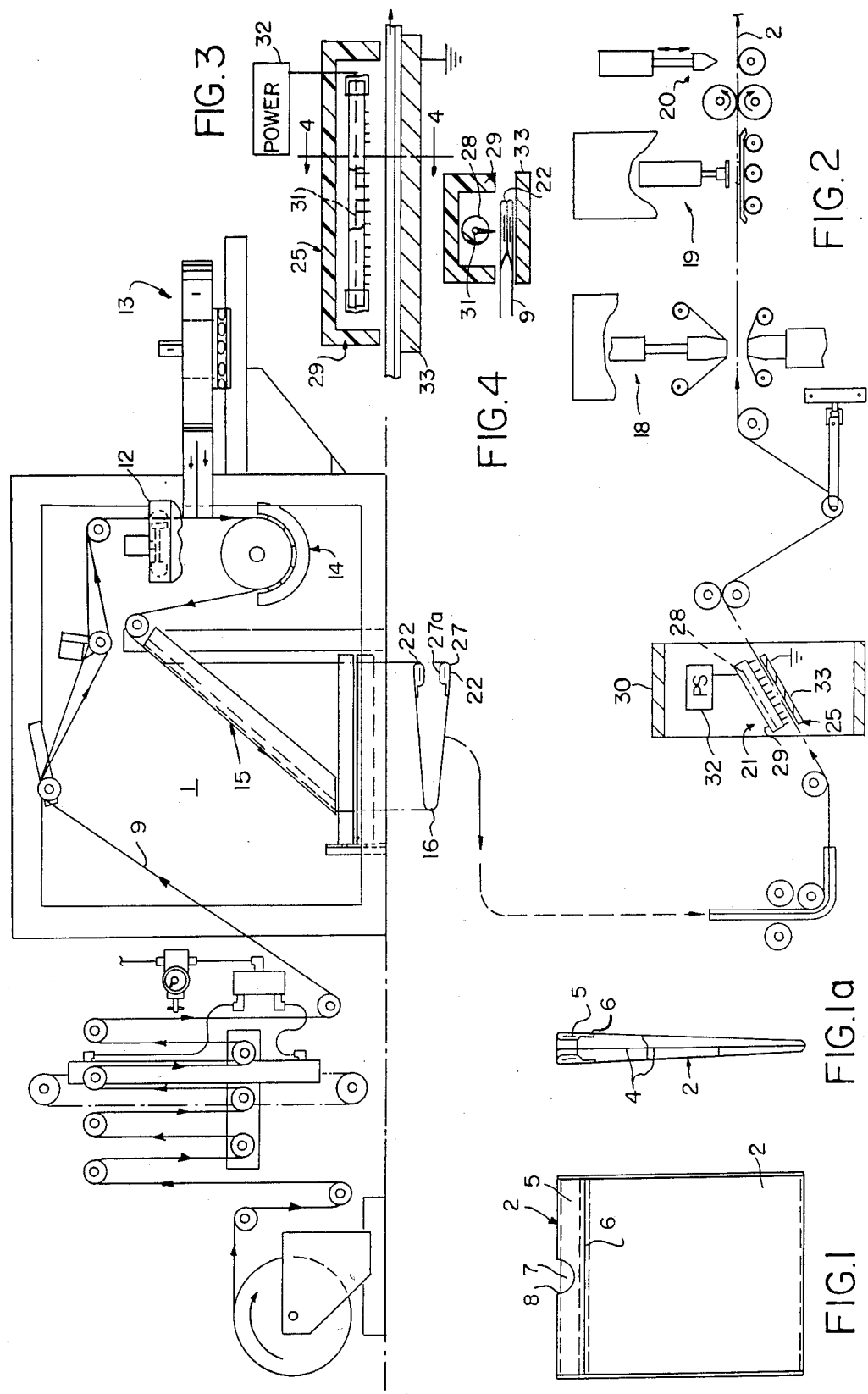

WEB HEM METHOD AND APPARATUS FOR INSURING A FLAT HEM IN A WEB

BACKGROUND OF THE PRESENT INVENTION

The present invention relates to an apparatus and method for insuring a flat hem portion in a moving film-like web in a hem forming machine.

In forming a draw tape bag, a plastic web is supplied from a roll of indefinite length in a continuous flow to form a series of like bags. U.S. Pat. No. 4,624,654 which issued Nov. 25, 1986 and U.S. Pat. No. 4,664,649 which issued May 12, 1987 disclose draw tape bag forming apparatus for forming a plastic bag with a draw-tape for closing the bag from a prefolded continuously moving web, with special means for folding the edges to form aligned hems which are heat sealed. A method and apparatus for forming a draw tape bag from a flat sheet-like web is shown the in copending application of Robert J. Wech entitled "Draw Tape Bag Forming Method and Apparatus", which was filled on even date herewith and is assigned to a common assignee herewith. Generally, as disclosed therein, a roll of a pliable plastic sheet web is mounted in an unwind stand. The plastic sheet is withdrawn and passed through a series of stations for forming a series of draw tape bags. Generally, the flat web is fed into a hem former which is adapted to fold the edges of the web inwardly to form a hem portion which receives a draw tape through a tape inserter unit followed by heat sealing of the hem. The hemmed plastic sheet is folded on itself, and passed through a bag making machine or apparatus which transversely seals and severs the folded web on longitudinally spaced transverse areas to complete the series of the draw tape bags.

In operation of draw tape bag apparatus, inferior bags may be encountered if the hems are not flat. As the hemmed and holded web moves through the hem forming apparatus, the hem walls may tend to separate from the desired flat condition for optimum machine operation.

There is therefore a need for a method and apparatus to positively insure a flat, folded web for final on-line movement through the bag making apparatus.

SUMMARY OF THE INVENTION

The present invention is particularly directed to simple and reliable apparatus for in-line processing the sealed hems to positively insure that the hem portion is flat in a continuously moving folded web or the like, and permitting subsequent transverse sealing and severing of a folded web with a high quality edge.

Generally, in accordance with the present invention, the hemmed web is subjected to an electrostatic field, which appears to charge the plastic layers in the hem in such a manner to attract the layers and insure a totally flattened hem. The flattened hem creates a flat sheet-like member for subsequent processing including the transverse heat sealing of the folded web. More particularly, in the continuous bag forming apparatus, a web is continuously processed to form the edge hems in the opposite longitudinal edges of the web with the tape inserted into the open hems which are then sealed along the longitudinal inner edge. The prefolded or subsequently hemmed folded web moves through the hem flattening station or apparatus. An elongated static generator is mounted in alignment with the sealed hems. The static electric field results in rapid charging of the hem walls and tape and the hem collapses on itself such that a flat web is insured. More particularly, in accordance with commercial constructions, the static generator includes a suitable high voltage discharge bar aligned with a reference plane member. The discharge bar is connected to a high voltage supply and establishes a high voltage static electric field. The discharge bar is mounted in alignment with the hem, with a gap in accordance with known procedures which are generally recommended by the manufacturer. As the hem portion passes through the elongated gap, the walls of the hem and the tape are attracted to and collapse onto the reference plane member to form the flat hem with the tape therein.

The present invention has been found to insure the quality of the bag as formed in a draw tape bag forming unit and particularly in permitting the continued on-line processing of the hemmed web. The apparatus provides a simple, reliable and cost effective in-line unit.

BRIEF DESCRIPTION OF THE DRAWINGS

The drawings furnished herewith generally illustrate the best mode presently contemplated for the invention and are described hereinafter.

In the drawings:

FIGS. 1 and 1a are front and side views respectively of a draw tape bag;

FIG. 2 is a view of a draw tape bag forming apparatus including an electrostatic generator for processing a sealed hemmed web in accordance with the teaching of the present invention;

FIG. 3 is an enlarged fragmentary view of the hemmed web and generator shown in FIG. 2 to more clearly illustrate the present invention; and FIG. 4 is a vertical section taken generally on line 4—4 of FIG. 3.

DESCRIPTION OF THE ILLUSTRATED EMBODIMENT

Referring to the drawings and particularly to FIGS. 1-2, a draw tape bag forming apparatus 1 is shown for forming a draw tape bag 2. The bag 2 is formed of a single integral plastic web and includes opposite similar plastic side walls having an integral bottom edge 3. The side edges of the bag are formed by heat sealed edge seams 4. The top or open end of the bag is formed with a hem 5 integral with each side wall. The inner wall of the hem 5 is formed by folding the side wall inwardly and forming the hem walls by a heat sealed seam 6 as an extension of side edge seams 4. Seams 6 define an internal tubular portion. Similar draw tapes 7 are located in each side hem 5 with the opposite ends of the tapes sealed to the sealed side edges of the bag. Each hem 5 has an opening 8, generally centrally of the side wall and centrally between the edge seams 4. Pulling outwardly on the draw tapes 7 causes the open end of the bag 2 to releasably collapse and close.

A complete description of the method and apparatus as shown in FIG. 2 for manufacture of a draw tape bag is disclosed in the above co-pending application of Robert J. Wech, wherein a flat single ply web 9 is sequentially passed through a hem folding station 11 for folding the opposite edges of web 9 inwardly to form the walls of the hem 5, a notching station 12 to form opening 8, a tape inserting station 13 for inserting tape 7 and a hem sealing station 14 for forming the hem seal 6. The hemmed web is folded at a folding station 15 on the center line of the web 9 to align the hems 5. The folded web 16 is passed through a bag making machine 17, which seals and severs the folded web 16 on longitudinally spaced transverse areas to complete the individual bags. Machine 17 preferably includes a preseal unit 18 for creating a thermal weld of the tape 7 to the walls of hem 5 at the side seams 4. A cooling unit 19 cools the presealed hem seam 6 and a thermal sealing and severing unit 20 form the side seams and severs the folded presealed web on the transverse area to form the side edge seams 4 in adjacent bags 2. The hem folding unit, notching unit, tape inserting unit, sealing unit and web folding unit as well as the several units for making the final bag may be of any desired construction. The present invention is particularly directed to a special collapsing unit 21 coupled to the formed hems 5 of the folded web 16 prior to passing of the folded web 16 through the bag making machine 17, and particularly the presealer 18.

In the formation of the sealed hems 5 with the continuous uninterrupted movement of the plastic web through the various units, the walls of hem 5 may be held apart by static electricity and not provide a totally flat web, as shown at 22 in FIGS. 2 and 3. The folded web 16 is preferably continually processed from the hem forming and folding station into the final bag making machine in a continuous uninterrupted manner. A parted hem may interfere with optimum operation of the downstream apparatus, and in particular formation of a neat, wrinkle-free hem seam and bag unit.

The collapsing unit 21 of the present invention insures a flat hem configuration which moves in a smooth fashion through the bag forming machine.

In accordance with the invention, the collapsing unit 21 includes an electrostatic generator unit 25 coupled to the moving hem 5 downstream of the the web folding unit 15, as shown in the illustrated embodiment. The generator unit 25 creates a high voltage static electric charge field 26 which serves to insure that the opposed walls 27 and 27a form a flat continuous folded web without interruption in the movement of the web 1 to the bag making machine 17.

More particularly in the illustrated embodiment of the invention, the hem 22 moves past the electrostatic generator unit 25 which induces a charge into the plastic of the hem. The electrostatic generator unit 25 consists of an elongated charging bar 28 mounted in an insulated mounting unit 29 to the machine frame 30. A high voltage element 31 within the bar member 28 is connected to an appropriate high voltage power supply 32. The illustrated embodiment is shown in which the charge field 26 is formed from bar 28 to a ground plane, established by a flat metal plate 33 mounted in spaced parallel relation to bar 28, and forming the gap through which hem 22 passes. The electrostatic field 26 between bar 28 and plate 33 is coupled to the hem 22, and in accordance with known phenomena, charges form on on the plastic walls of the hem 22. The charge on the several layers of hem 22 create an attraction of the layers to each other, and particularly to the ground reference plate 33. The hem 22 is thus attracted to plate 33 and the hem walls rapidly collapse to the desired collapsed flat configuration, with the air moving freely through the notched openings 8.

The electrostatic generator unit 25 may be of any suitable known or desired construction. In practice, the inventor has used an electrostatic generator including a power source and charging bar manufactured and sold by Simco Company, Inc. of Hatfield, Pa. 19440-1998. The power source is a 120 volt power unit model N16V. The charging bar was type RC-3 model. The power supply is coupled to a conventional 120 voltage power supply distributed in the United States, which creats a high voltage on bar 28. The static generating bar 28 was spaced approximately ¾ to one inch from the hem 22 in the folded web 16, in accordance with the manufactured specification. The location of the elements with respect to the hem walls is not critical but should be placed sufficiently close to ensure inducement of the appropriate collapsing charge.

In a commerical draw tape bag apparatus incorporating the embodiment of the invention, a flat web was maintained and directly passed through a bag making machine as shown. The apparatus produced bags of excellent quality.

The present invention provides a commercially cost effective method and apparatus for insuring a flat hem and permitting a continuous movement of the folded hemmed web to a roll rewinder for subsequent processing or directly through the bag making machine.

Various modes of carrying out the invention are contemplated as being within the scope of the following claims particularly pointing out and distinctly claiming the subject matter which is regarded as the invention.

We claim:

1. In a draw tape bag apparatus including an edge folding means for folding a hem in a pliable plastic web for receiving a draw tape, a heat sealing means for forming a heat seal along the inner edge of the hem, the improvement comprising an electrostatic generator means mounted downstream of the heat sealing means and thereby said hem and establishing a high voltage static field, and means passing said hem through said field of said electrostatic generator means to induce a charge in the walls of the hem to insure a flat hem in said web.

2. The apparatus of claim 1 wherein said generator means includes first and second elongated static charging members defining a gap through which said static field is created and the hem passes.

3. The apparatus of claim 2 wherein said generator means includes a power supply connected to said members and establishes said high voltage between said members.

4. The apparatus of claim 2 wherein said generator means includes a negative voltage power supply connected to one of said members and establishes high negative voltage relative to the other members as a ground.

5. The apparatus of claim 1 wherein said generator means includes a charging bar and a ground plate mounted in the path of the hem, and a high voltage supply connected to said charging bar to establish said static field between said bar and said ground plate.

6. The apparatus of claim 5 wherein said bar is about twenty four inches long.

7. The apparatus of claim 1 including folding means to fold said web on itself with said hems in aligned abutting relation, said folding means being located upstream of said electrostatic generator means.

8. The apparatus of claim 7 wherein said generator means includes an elongated static charging bar mounted and spaced slightly from the path of the moving hem, and a reference plane metal plate mounted to the opposite side of said moving hem.

9. The apparatus of claim 8 wherein said bar and plate are each about twenty four inches long.

10. The method of forming a draw tape bag from a folded web having a pair of aligned side edge portions comprising forming each of said edge portions of the web with a hem with a plastic tape therein, applying a high voltage electrostatic field to said hems to induce a charge in the walls of the hem to insure said hems remain flat during subsequent processing of the web, and heat sealing the web including said hems on longitudinally spaced transverse areas extended completely across the folded web including said hems.

11. The method of claim 10 including establishing said electrostatic field between a pair of elongated conducting members at least one of which is a flat plate-like member, said members being spaced from each other, said web being passed through said field with the hems parallel to said members.

12. The method of claim 11 including the step of establishing the field with said flat plate-like member connected to a reference ground.

13. In a method of forming a draw tape bag wherein a plastic web is continuously and uninterruptly moved through a hem forming machine including means for forming a sealed hem on the edge of the plastic web, and folding the web on a center line to form a double layer web with the sealed hems aligned and a bag making machine transversely heat sealing spaced areas of said folded web, comprising the step of applying an elecrostatic field to said aligned sealed hems downstream of the hem forming machine to insure a flat hem generally in the plane of the web for subsequent bag processing in said bag making machine.

* * * * *